US012350860B2

(12) United States Patent
Ewers et al.

(10) Patent No.: US 12,350,860 B2
(45) Date of Patent: Jul. 8, 2025

(54) HOME RECYCLING MACHINE

(71) Applicants: Caroline Alexandra Ewers, Germantown, MD (US); Leandra Glage, Potomac, MD (US); Benjamin Knigge, Bethesda, MD (US)

(72) Inventors: Caroline Alexandra Ewers, Germantown, MD (US); Leandra Glage, Potomac, MD (US); Benjamin Knigge, Bethesda, MD (US)

( * ) Notice: Subject to any disclaimer, the term of this patent is extended or adjusted under 35 U.S.C. 154(b) by 261 days.

(21) Appl. No.: 18/105,857

(22) Filed: Feb. 5, 2023

(65) Prior Publication Data

US 2024/0262011 A1 Aug. 8, 2024

(51) Int. Cl.
*B09B 3/32* (2022.01)
*B09B 3/35* (2022.01)
(Continued)

(52) U.S. Cl.
CPC ............ *B29B 17/0052* (2013.01); *B09B 3/32* (2022.01); *B09B 3/35* (2022.01); *B29B 2017/0279* (2013.01)

(58) Field of Classification Search
None
See application file for complete search history.

(56) References Cited

U.S. PATENT DOCUMENTS

2024/0246262 A1* 7/2024 Elbaz Sror ................ G07F 7/06

FOREIGN PATENT DOCUMENTS

| CN | 115230019 A | 10/2022 | |
| EP | 2569102 A2 * | 3/2013 | ............ A61L 11/00 |

(Continued)

*Primary Examiner* — Yung-Sheng M Tsui
(74) *Attorney, Agent, or Firm* — Ewers IP Law PLLC; Falk Ewers

(57) ABSTRACT

A device for recycling a plastic container includes a housing with an opening to receive the plastic container. A moving part is movably arranged within the housing on which, in a first position of the moving part, the plastic container is placed such that a first portion of the plastic container is arranged inside the housing and a second portion of the plastic container is arranged outside the housing. An ultraviolet (UV) light device including a UV light emitter and a UV light detector is arranged in proximity to the opening and configured such that a UV light beam emitted by the UV light emitter radiates through the plastic container which is detected by the UV light detector. A controller is in communication with the UV light device and the moving part. The moving part is configured to move to a second position in which the plastic container is entirely placed inside the housing in response to a control signal from the controller indicating that the plastic container can be recycled. A first cutter is rotatably arranged in the housing and configured to separate an upper portion of the plastic container from an intermediate portion of the plastic container. A second cutter is rotatably arranged in the housing and configured to separate a lower portion of the plastic container from the intermediate portion of the plastic container. A third cutter is rotatably arranged in the housing and configured to cut the intermediate portion of the plastic container in an axial direction such that the intermediate portion, when it is rolled out to a flat form, has a rectangular shape. A mold unit has a first press mold part and a second press mold part. A robot unit is configured to roll out the intermediate portion of the plastic container, to move the intermediate portion of the plastic container to the mold unit, and to place the intermediate portion of the plastic container between the first press mold part and the second press mold part.

4 Claims, 5 Drawing Sheets

(51) Int. Cl.
*B29B 17/00* (2006.01)
*B29B 17/02* (2006.01)

(56) References Cited

FOREIGN PATENT DOCUMENTS

| KR | 20230169522 A | * | 6/2022 | |
|----|---------------|---|--------|---|
| KR | 20240085305 A | * | 12/2022 | |
| WO | WO-2020213020 A1 | * | 10/2020 | ............... B09B 3/00 |

* cited by examiner

HOME RECYCLING MACHINE

TECHNICAL FIELD

The invention relates to a device and a method for recycling plastic containers, and in particular, plastic bottles, in a home environment.

BACKGROUND

In today's world, far too much plastic is bought, used, and ultimately thrown away every day. Plastic water bottles represent a large portion of modern plastic waste. These bottles are bought, the water is consumed, and then the bottles are thrown away in the trash. Large industrial recycling companies control the handling of the plastic waste. While it is common to separate plastic waste, such as water bottles, from other domestic waste, and while it is assumed that the waste collection companies dispose of the plastic waste properly, it is not known exactly to the consumer what really happens to the plastic waste. Many people do not know, for example, that the plastic waste is often sent to developing countries, which increases the profit of the industrial recycling companies. However, it is unknown to the consumer what happens to the plastic waste in these developing countries. It has been found that plastic waste may end up in the oceans and forests. The biggest problem is that plastic takes 500 to 1,000 years to decompose. Plastic bottles may even take up to 5,000 years to decompose.

A smart recycling cabinet for recyclable plastic bottles is described in Chinese Patent Application Publication No. CN 115230019 A. The smart recycling cabinet includes a heat treatment component which heats and thereby melts the plastic bottles after being squeezed and punctuated. The liquid plastic flows in a collection box where it is stored for further use.

Applicants determined that the above-described procedure has multiple disadvantages. For example, the smart recycling cabinet collects rainwater which indicates that the smart recycling cabinet must be installed outside. This is also necessary because, as Applicants determined, water bottles typically are made of Polyethylene terephthalate (PET) which, when the PET is liquified, releases gases. These gases may be toxic. In addition, by releasing these gases, certain substances are removed or extracted from the resulting plastic mass. Therefore, as observed by the Applicants during various experiments, the resulting plastic mass is brittle and breaks easily. Consequently, it is difficult to form new plastic pieces with this liquified plastic mass without adding a softener or plasticizer. Therefore, softeners or plasticizers most likely must be added to reuse the plastic mass after liquifying it.

If the newly formed plastic pieces are to be reused in a home environment, and in particular, if the newly formed plastic pieces are to be brought into contact with food, one needs to make sure that no toxic chemicals are added to the plastic mass. Unfortunately, Applicants determined that softeners or plasticizers are typically considered to be toxic to a certain degree. Therefore, such substances need to be avoided.

In view of the foregoing, there has been a continuing need for a recycling system which provides full control over the entire recycling process, and which can be operated in a household environment, i.e., in a kitchen inside a residence. In addition, there is a need to produce the recycling apparatus with relatively low costs, to reduce complexity of such systems, and to provide a great flexibility.

SUMMARY

It is therefore an object of the present invention to provide a home recycling machine which can recycle plastic containers, and in particular plastic bottles, and which avoids the above-described disadvantages.

This object is achieved by a device and a method for recycling a plastic container, i.e., a home recycling machine, as described herein.

It is a general concept of the present invention to transform old empty bottles into a new useful product. For example, with the present invention, it is possible to produce plastic plates, plastic cups, or coasters from the recycled plastic of the plastic bottles. The bottles no longer have to be thrown away, and the customer has full control over what happens to their plastic waste. The environment will also be protected because it will no longer be polluted with plastic bottles.

Before the plastic bottles are placed into the home recycling machine, the lid and the label must be removed. In addition, any glue with which the label is attached to the plastic bottle may be removed with acetone, for example. According to another exemplary embodiment, the plastic bottle can also be clean within a cleaning unit within the home recycling machine.

After the label is removed from the plastic bottle and the plastic bottle is placed in the machine, it is shined through with a UV light. The UV light emitter is arranged on one side of the plastic bottle and the UV light sensor is arranged opposite to the UV light emitter. The sensor detects a frequency spectrum. The frequency spectrum is analyzed by the controller which determines based on the frequency spectrum whether the plastic material of plastic bottle can be recycled. There are various plastic types in total, each resulting in a different frequency spectrum. If it is determined by the controller that it is an eligible plastic type, a message is displayed on the display screen which indicates that the plastic bottle is "OKAY TO RECYCLE". As an alternative, a green light may be turned on. The display screen can be a touch screen. Now the customer can select which product to create by entering the selection on the touch screen. According to an aspect of the invention, a message may be displayed indicating the amount of plastic and the time needed to produce a certain new plastic product.

Thereafter, the plastic bottle, which is placed on a moving part, is entirely moved inside the housing.

According to an aspect of the invention, the device for recycling a plastic container includes a housing with an opening, the opening being configured to receive the plastic container, a moving part movably arranged within the housing on which, in a first position of the moving part, the plastic container is placed such that a first portion of the plastic container is arranged inside the housing and a second portion of the plastic container is arranged outside the housing, an ultraviolet (UV) light device including a UV light emitter and a UV light detector arranged in proximity to the opening and configured such that a UV light beam emitted by the UV light emitter radiates through the plastic container and is detected by the UV light detector, a controller in communication with the UV light device and the moving part; wherein the moving part is configured to move to a second position in which the plastic container is entirely placed inside the housing in response to a control signal from the controller indicating that the plastic container can be recycled, a first cutter rotatably arranged in the housing and configured to separate an upper portion of the plastic container from an intermediate portion of the plastic container, a second cutter rotatably arranged in the housing and configured to separate a lower portion of the plastic container from the intermediate portion of the plastic container, a third cutter rotatably arranged in the housing and configured to cut the intermediate portion of the plastic container in an axial direction such that the intermediate portion, when it is rolled out to a flat form, has a rectangular shape, a mold unit having a first press mold part and a second press mold part; and a robot unit configured to roll out the intermediate portion of the plastic container, to move the intermediate portion of the plastic container to the mold unit, and to place the intermediate portion of the plastic container between the first press mold part and the second press mold part.

According to another aspect of the invention, the method for recycling a plastic container, includes receiving the plastic container in an opening of a housing of a device for recycling the plastic container, movably arranging a moving part within the housing on which, in a first position of the moving part, the plastic container is placed such that a first portion of the plastic container is arranged inside the housing and a second portion of the plastic container is arranged outside the housing, arranging an ultraviolet (UV) light device including a UV light emitter and a UV light detector in proximity to the opening, emitting a UV light beam by the UV light emitter such that the UV light beam radiates through the plastic container, and detecting the UV light beam by the UV light detector, providing a controller in communication with the UV light device and the moving part; wherein the moving part is configured to move to a second position in which the plastic container is entirely placed inside the housing in response to a control signal from the controller indicating that the plastic container can be recycled, separating an upper portion of the plastic container from an intermediate portion of the plastic container with a first cutter rotatably arranged in the housing, separating a lower portion of the plastic container from the intermediate portion of the plastic container with a second cutter rotatably arranged in the housing, cutting the intermediate portion of the plastic container in an axial direction with a third cutter rotatably arranged in the housing and such that the intermediate portion, when it is rolled out to a flat form, has a rectangular shape, providing a mold unit having a first press mold part and a second press mold part, and rolling out the intermediate portion of the plastic container, moving the intermediate portion of the plastic container to the mold unit, and placing the intermediate portion of the plastic container between the first press mold part and the second press mold part.

BRIEF DESCRIPTION OF THE DRAWINGS

The invention will now be described with reference to the drawings wherein.

DESCRIPTION OF EXEMPLARY EMBODIMENTS

Exemplary embodiments of the disclosure will be explained below with reference to the accompanying schematic figures. Features that coincide in their nature and/or function may in this case be provided with the same designations throughout the figures.

The terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" may refer both to the situation in which no further element aside from B is provided in A (that is to say to a situation in which A is composed exclusively of B) and to the situation in which, in addition to B, one or more further elements are provided in A, for example element C, elements C and D, or even further elements.

Furthermore, the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Also, the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by a person of ordinary skill in the art, can also be carried out using other configurations. Similarly, features introduced by "in one embodiment of the invention" or "in one exemplary embodiment of the invention" are to be understood to be optional features, without this being intended to restrict alternative refinements or the scope of protection of the independent claims. Furthermore, all possibilities of combining the features introduced by these introductory expressions with other features, whether optional or non-optional features, are intended to remain unaffected by said introductory expressions.

Techniques are presented herein to do A and B. The techniques are used to do C and D.

Figure 1:
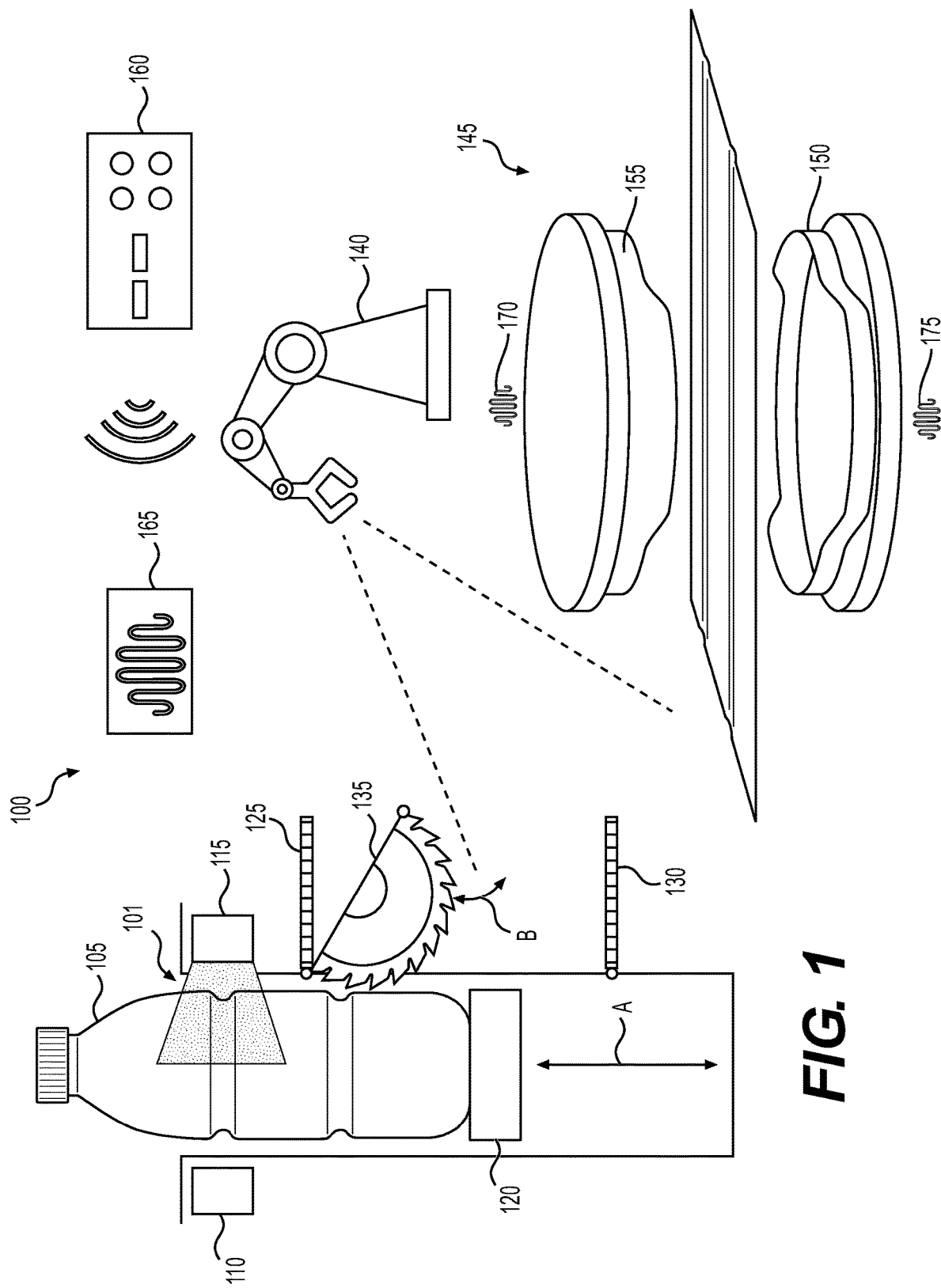
FIG. 1 shows a schematic illustration of a device for recycling a plastic container according to a first exemplary embodiment of the invention.

FIG. 1 shows a schematic illustration of a device 100 for recycling a plastic container (105) according to an exemplary embodiment of the invention. The device 100 for recycling a plastic container, includes a housing. The housing has an opening 101. The opening 101 is configured to receive the plastic container and has generally a cylindric form.

Figure 2B:
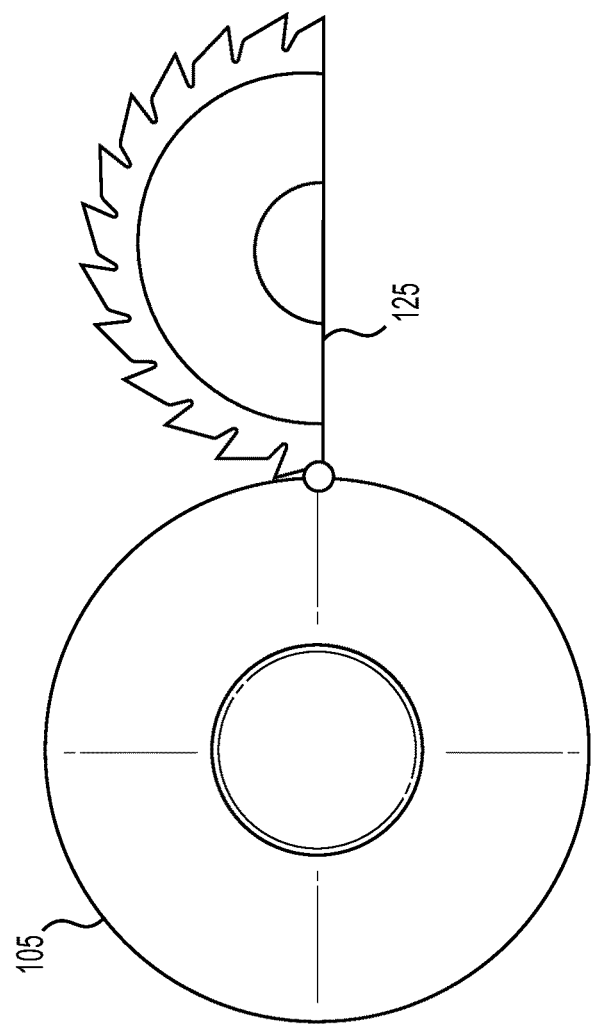
FIG. 2B shows a top view of the illustration shown in FIG. 2A.
Figure 2A:
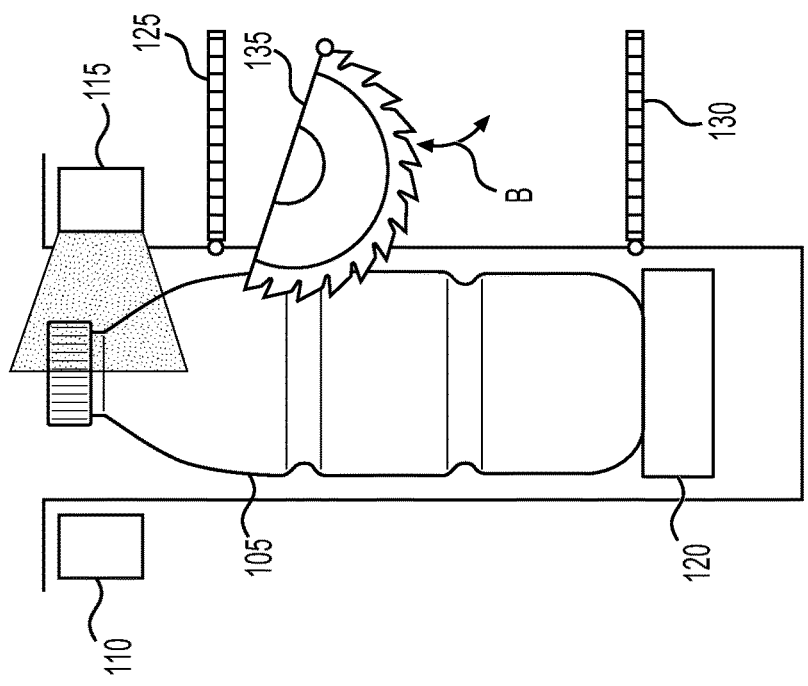
FIG. 2A shows a schematic illustration of a cylindric portion of the housing and a position of the moving part at which the plastic container is entirely placed within the device for recycling a plastic container.

FIG. 1 further shows a moving part 120 which is movably arranged within the housing and on which, in a first position of the moving part, the plastic container 105 is placed such that a first portion of the plastic container is arranged inside the housing and a second portion of the plastic container is arranged outside the housing. A second position of the moving part 120 is shown in FIG. 2A in which the plastic container is entirely arranged inside the housing.

As also shown in FIG. 1, the device 100 includes an ultraviolet (UV) light device which includes a UV light emitter 115 and a UV light detector 110 arranged in proximity to the opening 101 and configured such that a UV light beam emitted by the UV light emitter 115 radiates through the plastic container 105 and is detected by the UV light detector 110.

A controller 160 is arranged inside the housing which is in communication with the UV light device 110, 115 and the moving part 120. The moving part 120 is configured to move to a second position shown in FIG. 2A in which the plastic container is entirely placed inside the housing in response to a control signal from the controller indicating that the plastic container can be recycled.

In addition, the device 100 includes a first cutter 125 rotatably arranged in the housing and configured to separate an upper portion of the plastic container 105 from an intermediate portion of the plastic container.

As shown in FIG. 1, the device 100 further includes a second cutter 130 rotatably arranged in the housing and configured to separate a lower portion of the plastic container 105 from the intermediate portion of the plastic container 105. Both, the upper and the lower portions of the plastic container 105 can be stored thereafter in a separate storage (not shown) in the housing.

As further shown in FIG. 1, a third cutter 135 is rotatably arranged in the housing and rotates about an axis perpendicular to the axes of rotation of the first and second cutters 125 and 130. The third cutter 135 is configured to cut the intermediate portion of the plastic container in an axial direction of the plastic bottle 105. A robot unit 140 has at least two grippers and is configured to grab the intermediate portion on each side of the cutting edges created by the cut performed by the third cutter 135. A first heating element is activated and heats the air inside the housing to a temperature at which the intermediate portion of the plastic bottle 105 can be deformed or rolled out to a plane sheet or flat form. This plane rectangular sheet is moved by the robot unit 140 to mold unit 145. The mold unit 145 includes a first upper press mold 155 and a second lower press mold 150. The robot unit 140 places the rolled-out plane intermediate portion of the plastic bottle 105 between the first press mold part 155 and the second press mold part 150. The first press mold part 155 includes a second heating element 170 and the second press mold 150 includes a third heating element 175. These additional heating elements heat the first and second press mold parts 155 and 150 to a temperature at which the intermediate portion of the plastic bottle 105 can be deformed to a new item, such as a plastic plate. According to a further aspect of the invention, the mold unit 145 may also include a cutting mechanism (not shown) which cuts unnecessary portions of the molded intermediate portion away, for example for a plate to give it a circular shape.

Figure 3:
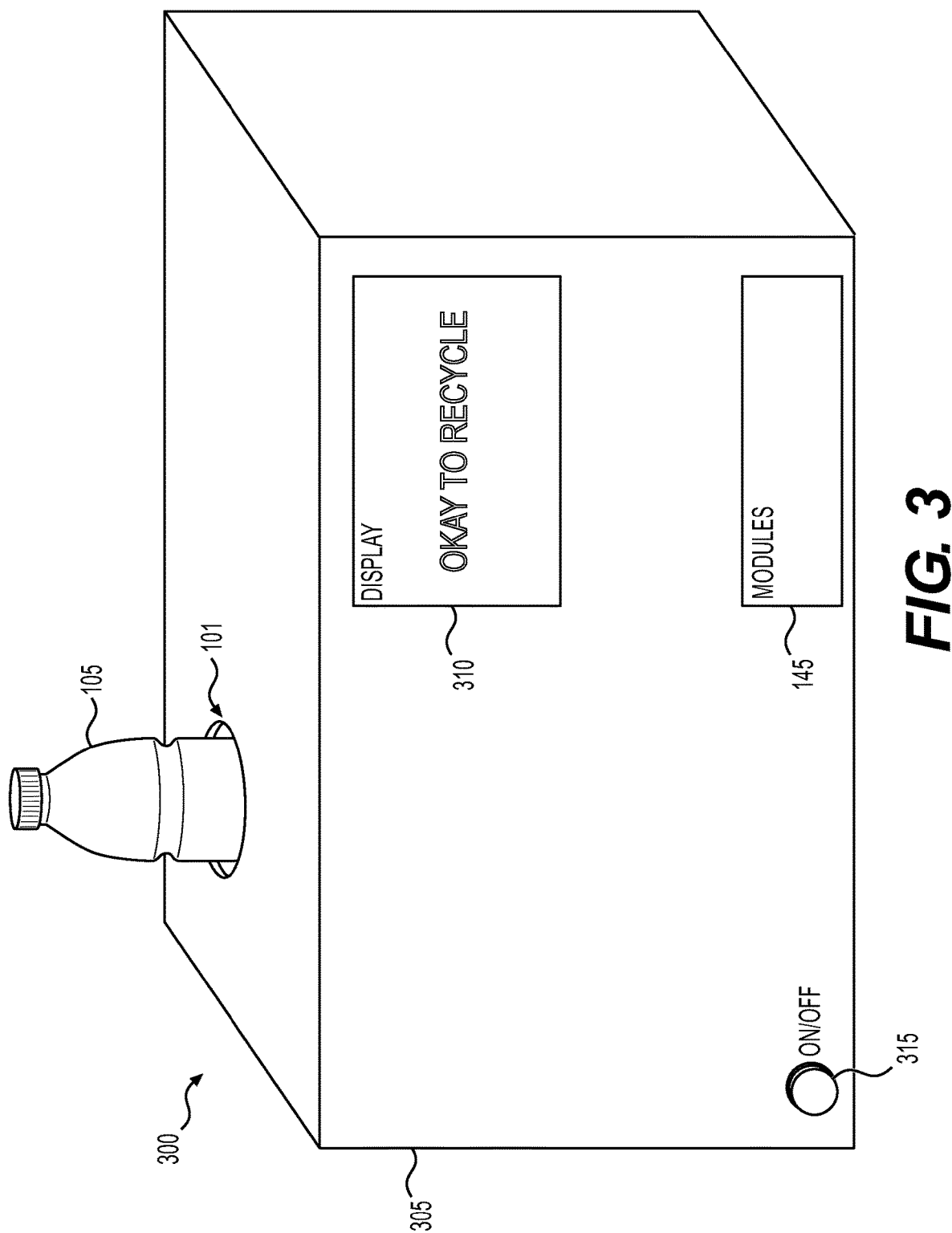
FIG. 3 shows a perspective view of the device for recycling a plastic container according to an exemplary embodiment of the invention.
Figure 5:
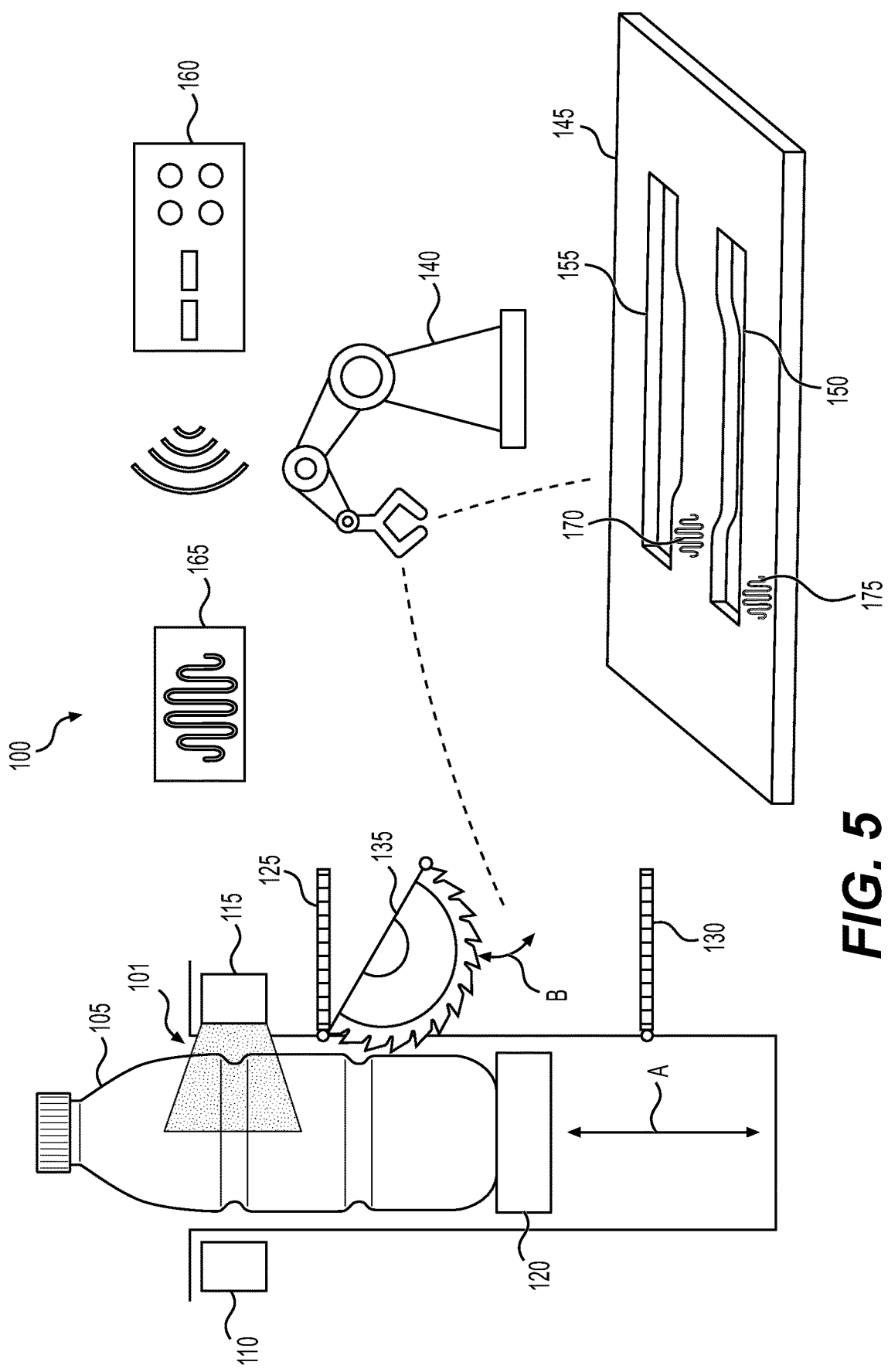
FIG. 5 shows a schematic illustration of a device for recycling a plastic container according to a second exemplary embodiment of the invention.

The mold unit 145 can be configured as a module in the form of a drawer illustrated in FIG. 3 which can be replaced with a different modular mold unit 145 shown, for example, in FIG. 5. This allows a plurality of different plastic pieces to be made from the recycled plastic bottle 105.

Reference is now made to FIG. 3 (with continued reference to FIG. 1) which is a perspective view of the device for recycling a plastic container 300. As can be seen in FIG. 3, the device for recycling a plastic container 300 has a housing 305 with an opening 101 into which the plastic bottle 105 is inserted. The device 300 can be turned on and off with a switch 315. In addition, the device 300 includes a display 310 which can be implemented as a touch screen display.

Figure 4:
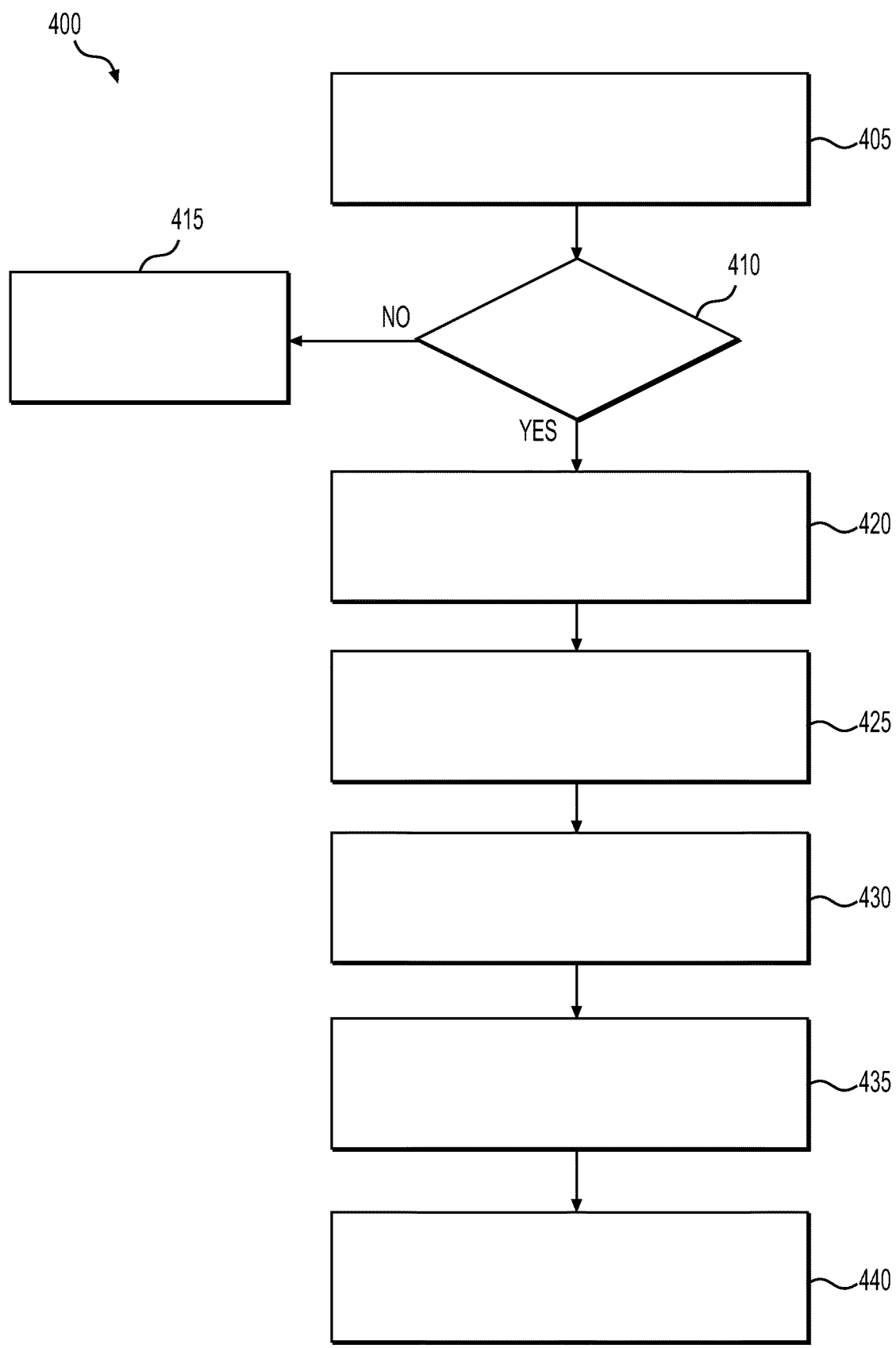
FIG. 4 shows a flow diagram of the method for recycling a plastic container according to an exemplary embodiment of the invention.

Referring now to FIG. 4 (with continued reference to FIG. 1), a flow chart is described of method 400 for recycling a plastic container. The method 400 begins at 405 at which a plastic container 105 is received in an opening 101 of the housing 305 of a device for recycling the plastic container 100, 300. A moving part 120 is movably arranged within the housing 305 on which, in a first position of the moving part 120, the plastic container 105 is placed such that a first portion of the plastic container is arranged inside the housing 305 and a second portion of the plastic container is arranged outside the housing, as shown in FIG. 3. In addition, an ultraviolet (UV) light device including a UV light emitter 115 and a UV light detector 110 is arranged in proximity to the opening 101. In step 405, a UV light beam is emitted by the UV light emitter 115 such that the UV light beam radiates through the plastic container 105, and is detected by the UV light detector 115.

At 410, controller 160 receives a signal from the UV light detector indicating a frequency spectrum. The frequency spectrum is analyzed by the controller 160. If it is determined that the plastic bottle 105 cannot be recycled, the method 400 continues to step 415 at which a notice is displayed on the display 310 indicating that the plastic bottle 105 cannot be recycled and needs to be taken out. If it is determined at step 410 that the plastic bottle 105 can be recycled, the method 400 continues to step 420 at which a notice is displayed on the display 310 indicating that the plastic bottle 105 can be recycled and a signal is sent to the moving part 120. In response to the control signal the plastic bottle 105 is moved by the moving part 120 to a second position at which the plastic bottle 105 is entirely placed inside the housing 305.

At step 425, an upper portion of the plastic container is separated from an intermediate portion of the plastic bottle 105 with a first cutter 125 which is rotatably arranged in the housing 305 and a lower portion of the plastic bottle 105 is separated from the intermediate portion of the plastic container with a second cutter 130 which is rotatably arranged in the housing 305.

The method 400 moves now to step 430 at which the intermediate portion of the plastic bottle 105 is cut in an axial direction with a third cutter 135 which is rotatably arranged in the housing 305.

At step 435, the intermediate portion is rolled out to a flat form which has a rectangular shape, is moved by the robot unit 140 to the mold unit 145 at which it is placed between the first press mold part 155 and the second press mold part 150.

Method 400 concludes with step 440 at which the intermedia portion of the plastic bottle 105 is press molded to a plate and cut to a circular shape.

It is understood that the foregoing description is that of the exemplary embodiments of the invention and that various changes and modifications may be made thereto without departing from the spirit and scope of the invention as defined in the appended claims.

What is claimed is:

1. A device for recycling a plastic container, the device comprising:
    a housing with an opening, the opening being configured to receive the plastic container;
    a moving part movably arranged within the housing on which, in a first position of the moving part, the plastic container is placed such that a first portion of the plastic container is arranged inside the housing and a second portion of the plastic container is arranged outside the housing;
    an ultraviolet (UV) light device including a UV light emitter and a UV light detector arranged in proximity to the opening and configured such that a UV light beam emitted by the UV light emitter radiates through the plastic container and is detected by the UV light detector;
    a controller in communication with the UV light device and the moving part; wherein the moving part is configured to move to a second position in which the plastic container is entirely placed inside the housing in response to a control signal from the controller indicating that the plastic container can be recycled;
    a first cutter rotatably arranged in the housing and configured to separate an upper portion of the plastic container from an intermediate portion of the plastic container;
    a second cutter rotatably arranged in the housing and configured to separate a lower portion of the plastic container from the intermediate portion of the plastic container;
    a third cutter rotatably arranged in the housing and configured to cut the intermediate portion of the plastic container in an axial direction such that the intermediate portion, when it is rolled out to a flat form, has a rectangular shape;
    a mold unit having a first press mold part and a second press mold part; and
    a robot unit configured to roll out the intermediate portion of the plastic container, to move the intermediate portion of the plastic container to the mold unit, and to place the intermediate portion of the plastic container between the first press mold part and the second press mold part.

2. The device for recycling a plastic container of claim 1, wherein the plastic container is a plastic bottle having a cylindrical shape.

3. A method for recycling a plastic container, the method comprising:
    receiving the plastic container in an opening of a housing of a device for recycling the plastic container;
    movably arranging a moving part within the housing on which, in a first position of the moving part, the plastic container is placed such that a first portion of the plastic container is arranged inside the housing and a second portion of the plastic container is arranged outside the housing;
    arranging an ultraviolet (UV) light device including a UV light emitter and a UV light detector in proximity to the opening, emitting a UV light beam by the UV light emitter such that the UV light beam radiates through the plastic container, and detecting the UV light beam by the UV light detector;
    providing a controller in communication with the UV light device and the moving part; wherein the moving part is configured to move to a second position in which the plastic container is entirely placed inside the housing in response to a control signal from the controller indicating that the plastic container can be recycled;
    separating an upper portion of the plastic container from an intermediate portion of the plastic container with a first cutter rotatably arranged in the housing;
    separating a lower portion of the plastic container from the intermediate portion of the plastic container with a second cutter rotatably arranged in the housing;
    cutting the intermediate portion of the plastic container in an axial direction with a third cutter rotatably arranged in the housing and such that the intermediate portion, when it is rolled out to a flat form, has a rectangular shape;
    providing a mold unit having a first press mold part and a second press mold part; and
    rolling out the intermediate portion of the plastic container, moving the intermediate portion of the plastic container to the mold unit, and placing the intermediate portion of the plastic container between the first press mold part and the second press mold part.

4. The method for recycling a plastic container of claim 3, wherein the plastic container is a plastic bottle having a cylindrical shape.

* * * * *